UNITED STATES PATENT OFFICE.

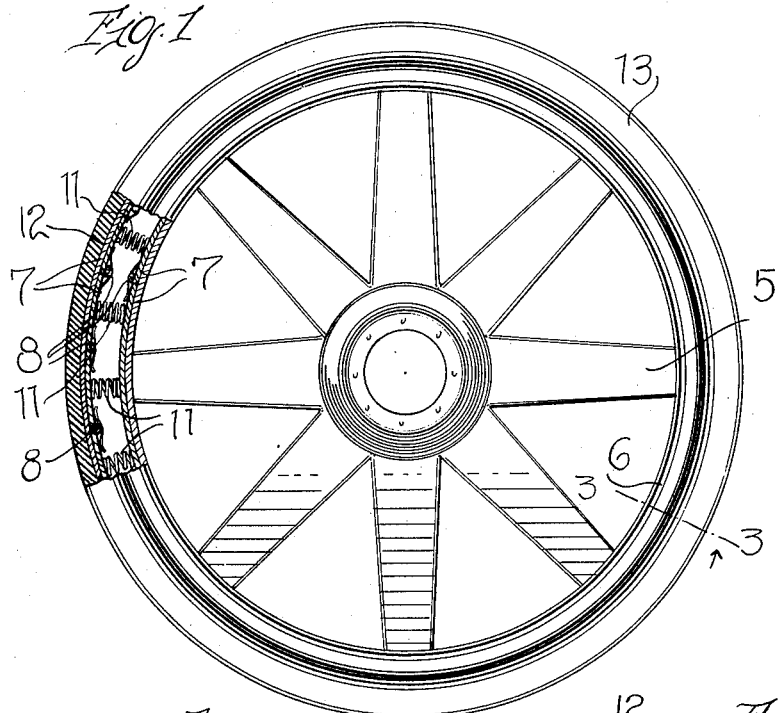

MANUEL SILVA, OF PROVINCETOWN, MASSACHUSETTS.

WHEEL-TIRE.

1,093,736.  Specification of Letters Patent.  Patented Apr. 21, 1914.

Application filed October 15, 1913. Serial No. 795,342.

*To all whom it may concern:*

Be it known that I, MANUEL SILVA, citizen of the United States, residing at Provincetown, in the county of Barnstable and State of Massachusetts, have invented certain new and useful Improvements in Wheel-Tires, of which the following is a specification, reference being had to the accompanying drawings.

This invention relates to an improved wheel tire and has for its primary object to provide a tire of improved construction which will serve as an efficient and reliable substitute for the common pneumatic tire now in general use, and obviate the expense incident to the repairs necessitated by punctures and other causes.

My invention has for another of its objects to provide a wheel tire of the above character which is particularly designed for use upon motor vehicles and may be easily and quickly applied to the wheel rim or removed therefrom.

The invention has for a further object to provide a resilient wheel tire which will absorb all shocks or jars and thereby prevent vibration of the vehicle body when traveling over rough roads.

The invention has for still another object to provide a tire of the above character which is extremely simple in its construction, highly efficient and durable in practical use and may be produced at comparatively small manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a wheel provided with my improved tire, said tire being shown partly in section; Fig. 2 is an enlarged longitudinal section illustrating the means for connecting the ends of the tire sections together; Fig. 3 is a transverse section taken on the line 3—3 of Fig. 1.

Referring in detail to the drawing, 5 designates a wheel upon the felly of which a rim 6 is secured, said rim being provided with a detachable annular flange 6'. To the outer face of this rim, between the curved edges thereof my improved tire is secured. This tire embodies in its construction, the inner and outer annular rings 7. The inner ring embodies two sections which are hingedly connected together by means of a spring hinge indicated at 8. The other opposed ends of the ring sections are provided with ears 9 to receive suitable bolts 10 whereby the inner ring sections may be drawn together and clamped in position upon the wheel rim, suitable clamping nuts being threaded upon the ends of said bolts.

It will be noted that the bolt receiving ears upon the inner annular ring 7 project outwardly while the ears upon the outer annular ring project inwardly. The outer ring 7 is made up of a plurality of sections hingedly connected together and normally held against relative movement by means of springs 8 in a similar manner to the spring hinge of the inner ring above referred to. Between the inner and outer rings 7 a series of coil springs 11 are arranged, said springs being secured at their outer ends to the outer ring sections. A casing ring 12 preferably constructed of sheet steel is disposed over the outer ring 7, the edges of said casing plate being disposed and freely movable between the edges of the rim 6. This flexible steel ring 12 is provided with an outer covering of rubber 13, which, in addition to the springs 11 renders the tire extremely resilient.

In the application of my improved tire to the rim of the wheel, the sections of the inner ring 7 are connected together and the outer sectional ring 7 arranged in position with respect thereto, the inner ends of the springs 11 carried by the outer ring sections being seated between the flanges on the inner ring sections. The sections of the outer ring are moved relative to each other, and the springs 11 compressed whereby said outer ring may be fitted within the tire casing ring 12, the springs 11 acting to force the outer ring sections outwardly into engagement with the intermediate portion of said casing ring, as clearly shown in Fig. 3. The tire after being thus assembled is applied to the periphery of the wheel rim 6, the flange 6' being detached therefrom. It will be understood that the inner ring sections are slipped over the periphery of the rim 6, and after the flange 6' has been applied and secured to the body of said rim, the edges of the rubber covering 13 of the tire by the outward pressure of the resilient walls of the ring 12 are frictionally engaged with said rim flanges, thereby excluding dust and dirt and preventing the same from finding its way into the interior of the casing and collecting upon the springs 11. It will of course, be understood that the tire may be readily removed by reversing the above described operation.

It will be seen that a tire constructed in the manner above described is simple and inexpensive to manufacture as well as highly durable and efficient in practical use. The casing for the tire proper may be constructed in various forms and it will therefore be understood that I do not desire to be limited in putting the invention into practice to the precise form of this casing illustrated in the drawings. My invention is also susceptible of a great many other modifications in the form, proportions and arrangements of the several parts and I therefore reserve the right to resort to all such legitimate changes as may be fairly embodied within the spirit and scope of the invention, as claimed.

Having thus described the invention, what is claimed is:

A wheel tire consisting of inner and outer annular rings, each of said rings consisting of a plurality of sections, spring hinges connecting the ring sections to yieldingly prevent their relative movement, bolts for connecting the opposed ends of adjacent ring sections, each of said sections having continuous longitudinal flanges formed upon its edges, a plurality of coiled springs carried by the sections of the outer ring and adapted to be seated upon the inner ring sections between the flanges thereof, a resilient sheet metal casing removably engaged upon the outer ring and having outwardly curved side walls, and a rubber covering secured upon the sheet metal casing ring, the resilient side walls thereof holding said cover at its edges in frictional engagement with the edges of the wheel rim, substantially as and for the purpose specified.

In testimony whereof I hereunto affix my signature in the presence of two witnesses.

MANUEL SILVA.

Witnesses:
WILLIAM SILVA,
ALFRED J. DEARS.